(Model.)
A. C. DUDLEY.
FEATHER RENOVATOR.
No. 270,030. Patented Jan. 2, 1883.
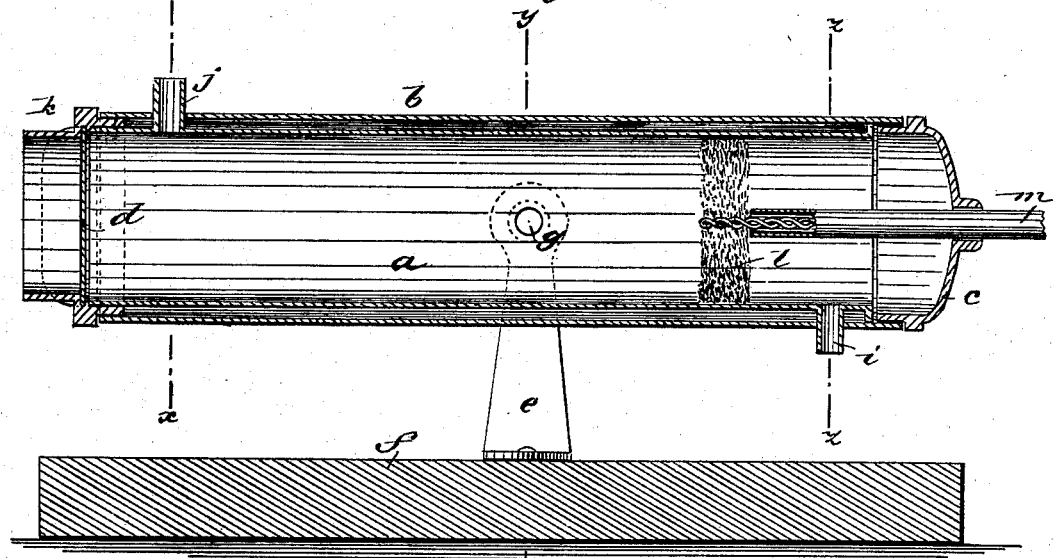
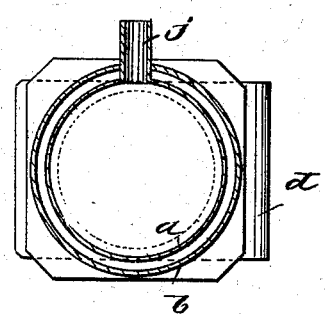
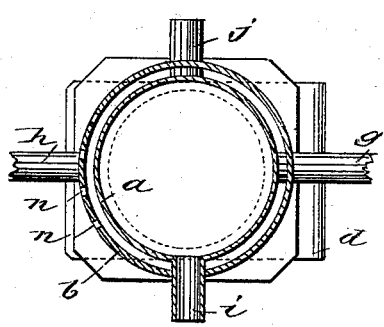
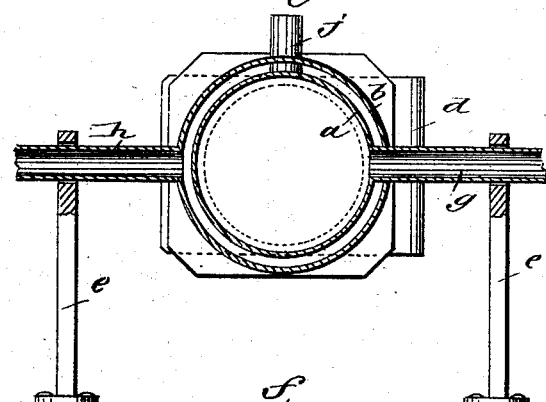
WITNESSES:
Otto Bigir
C. Sedgwick
INVENTOR:
A. C. Dudley
BY
Munn & Co
ATTORNEYS.

UNITED STATES PATENT OFFICE.

AUGUSTUS C. DUDLEY, OF NASHVILLE, TENNESSEE.

FEATHER-RENOVATOR.

SPECIFICATION forming part of Letters Patent No. 270,030, dated January 2, 1883.

Application filed November 15, 1882. (Model.)

*To all whom it may concern:*

Be it known that I, AUGUSTUS C. DUDLEY, of Nashville, in the county of Davidson and State of Tennessee, have invented a new and Improved Feather-Renovator, of which the following is a full, clear, and exact description.

My invention consists of a jacketed cylinder mounted in supports by trunnions on which it balances for convenience in operation, which trunnions supply steam to the cylinder and the jacket, respectively, in the renovating process; and said cylinder is provided with an extension for the connection of the tick to receive the renovated feathers and a discharger for delivering the feathers into said tick, together with suitable escape-passages for discharge of the steam and water, and a gate closing the opening through which the feathers are put in and taken out, all making a simple, cheap, and efficient portable apparatus, as hereinafter fully described.

Reference is to be had to the accompanying drawings, forming part of this specification, in which similar letters of reference indicate corresponding parts in all the figures.

Figure 1 is a longitudinal sectional elevation of my improved feather-renovator. Fig. 2 is a transverse section of Fig. 1 on line $x\ x$. Fig. 3 is a transverse section on line $y\ y$, and Fig. 4 is a transverse section on the line $z\ z$.

I take a hollow cylinder, $a$, of light iron or other approved metal and of any suitable size, in which to treat the feathers, and provide it with a jacket, $b$, closing said cylinder by a head, $c$, at one end, and by a sliding gate, $d$, at the other end, which jacketed cylinder I mount in supports $e$ on any suitable platform $f$ by hollow trunnions $g\ h$, one of which is connected to supply steam directly into the cylinder and the other is connected to supply the jacket, said trunnions to be suitably connected to steam-pipes from a boiler and having cocks arranged to let steam into the cylinder for direct action on the feathers as long as required, and then to shut off the steam therefrom and turn it into the jacket to dry off the moisture in the feathers, said pipes and cocks being of any common and well-known contrivance that need not be shown or described. The bottom of the cylinder has a waste-pipe connection, $i$, for the escape of the water of condensation, and the top has a waste-pipe, $j$, through which the steam may escape when drying off. These pipe-connections may be plugged up while the steam is acting on the feathers, if desired.

For the ready discharge of the feathers after having been sufficiently treated, I provide an extension, $k$, of one end of the cylinder $a$, on which the mouth of the bed-tick may be connected to receive the feathers, and in the opposite end of the cylinder I have a pusher, $l$, attached to the end of a rod, $m$, extending out through a central hole in the head $c$, and being of sufficient length to enable me to push out the feathers quickly into the tick. The pusher may be constructed in the form of brush-wires, if desired, or in any other suitable manner.

The jacket may have a series of holes, $n$, in the side for the escape of the steam used in it for heating the cylinder, and these holes may, if desired, be stopped during the heating process, or they may be left open for a circulation of the steam.

The head $c$ is to be detachably connected in any approved way for enabling the pusher $l$ to be put in the cylinder and taken out when required.

Having thus described my invention, what I claim as new, and desire to secure by Letters Patent, is—

1. The combination, in a feather-renovator, of hollow cylinder $a$, jacket $b$, hollow steam-trunnions $g\ h$, and the supports $e\ f$, said trunnions communicating with the cylinder and jacket, respectively, substantially as described.

2. The combination of pusher $l\ m$ with the feather-renovating cylinder $a$, having end-gate $d$, and tick-connecting extension $k$, substantially as described.

3. The combination, in a feather-renovator, of hollow jacketed cylinder $a$, steam-trunnions $g\ h$, and waste-pipes $i\ j$, substantially as described.

4. The combination, in a feather-renovator, of the jacketed cylinder $a$ and pusher $l\ m$, said cylinder having the removable end cover, $c$, substantially as described.

AUGUSTUS C. DUDLEY.

Witnesses:
L. P. HAGAN,
R. R. CALDWELL.